July 3, 1951 M. A. McCOY 2,559,023
PHASE MODULATION
Filed Feb. 21, 1949 2 Sheets-Sheet 1
FIG. 1.
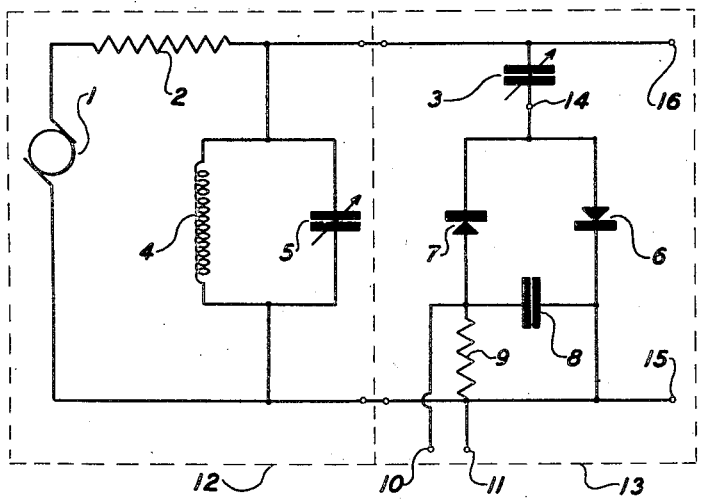
FIG. 2.
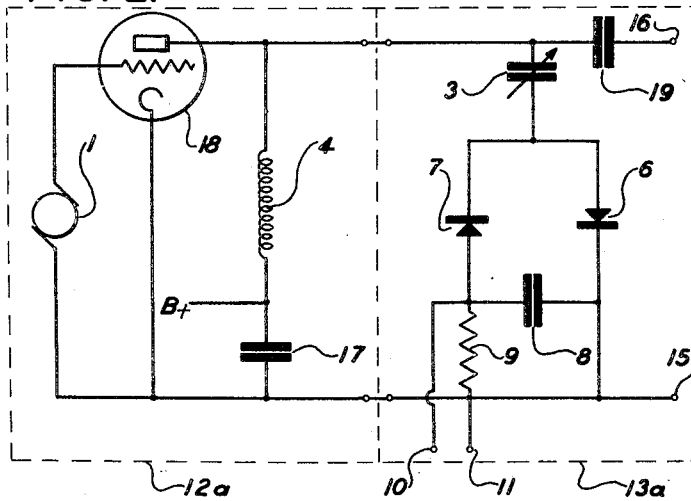
FIG. 3.
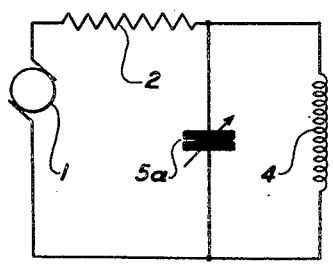
FIG. 4.
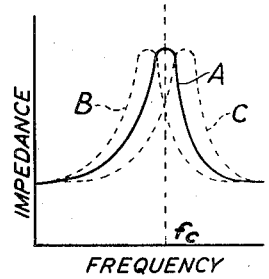
FIG. 5.
FIG. 6.
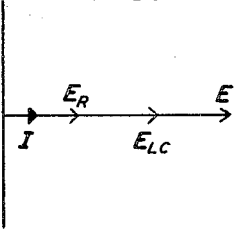
FIG. 7.
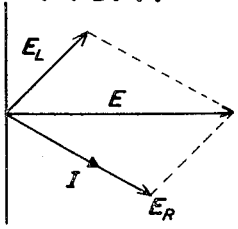
INVENTOR.
MARCUS A. McCOY
BY
D. Gordon Angus
ATTORNEY July 3, 1951  M. A. McCOY  2,559,023
PHASE MODULATION
Filed Feb. 21, 1949  2 Sheets-Sheet 2

INVENTOR.
MARCUS A. McCOY
BY
D. Gordon Angus
ATTORNEY

Patented July 3, 1951

2,559,023

UNITED STATES PATENT OFFICE 2,559,023

PHASE MODULATION

Marcus A. McCoy, Los Angeles, Calif., assignor to United Geophysical Company, Inc., Pasadena, Calif., a corporation of California Application February 21, 1949, Serial No. 77,514

17 Claims. (Cl. 332—29)

This invention relates to phase modulation, and has for its principal object to provide a phase modulation system which is simple in its arrangement and operation, and which is capable of producing a wide range of phase shift of a voltage from the phase of a reference carrier frequency voltage. A related object is to provide that the phase shift shall be proportional to the amplitude of a modulating voltage over a considerable range of frequency and amplitude of the modulating voltage. Another related object is to produce an exceptionally wide range of phase shift with relatively low modulating power. A further object is to provide a phase modulation circuit which in itself requires no vacuum tube or other complicated equipment.

Phase modulation has heretofore been accomplished in several ways. In some of these prior systems, special vacuum tube circuits have been used for producing the modulation. A typical example is the well known reactance tube type modulator wherein a vacuum tube is connected so as to produce a phase shift similar to that produced by a reactance in a circuit. Another well known example is the quadrature type of circuit wherein two vacuum tubes are used to obtain a resulting reactance effect to create the phase shift. Vacuum tube circuits of this character, however, require the addition of tubes and attendant power consumption.

In accordance with my present invention, the disadvantages of such prior known phase modulation systems utilizing vacuum tubes for producing the phase shift are overcome by the provision of a relatively simple system utilizing simple circuit elements and capable of phase modulation over a wide range of modulating voltage, intensity, and frequency, including D. C. voltage.

My invention is carried out by provision in a circuit containing a combination of inductance and capacitance tuned to resonance with the carrier frequency whose phase is to be modulated or varied, of an automatic switching arrangement for effectively switching a portion of the reactance in and out of the tuned circuit at the repetition rate of the carrier frequency. For the automatic switching arrangement there is preferably used a pair of non-linear impedances, such as rectifiers, effectively in parallel with each other and with their directions of forward conductivity opposed to each other. The pair of rectifiers in parallel is connected in series with the element of reactance to be switched, and a load network is provided in series with the rectifiers so that a bias voltage is established across the load by rectification of the carrier.

To produce phase modulation, a modulating voltage is impressed across the rectifier load, in addition to the bias resulting from rectification. The effect of this modulating voltage is to alter the switching of reactance in and out of the tuned circuit. By this novel system, the phase of voltage across the tuned circuit relative to the phase of voltage across the generator is shifted by the modulating voltage.

A feature of the arrangement is the provision of an impedance between the generator and the tuned circuit; this impedance being of a sufficient value effectively to isolate the tuned circuit from the generator so that variations at the tuned circuit will not substantially affect the generator frequency.

While the use of two non-linear impedances or impedance paths correlated as indicated above is preferred, phase modulation could also be had by the use of a single non-linear element or path with provision for a complete path for flow of the unidirectional current component developed at the non-linear impedance.

In my copending application, Serial No. 77,513, filed concurrently herewith, there is described and claimed a frequency modulation system comprising non-linear impedance means arranged to switch a reactance element in and out of circuit with a tuned circuit, in much the same manner as in the present application. A salient distinction between the present application and my said copending application is that in said copending application, the tuned circuit is closely connected or coupled with the generator so that variations of the tuned circuit affect the generator frequency, and thereby enable a frequency modulation to be produced. In the present application, on the other hand, the tuned circuit is sufficiently isolated from the generator by the isolating impedance, ordinarily a resistive impedance, so that variations of the tuned circuit do not substantially or greatly affect the generator frequency. This produces essentially phase modulation free from substantial frequency modulation.

The foregoing and other features and advantages of my invention will be better understood from the following detailed description and accompanying drawings of which:

Fig. 1 shows a phase modulation system according to my invention;

Fig. 2 shows another form of phase modulation system according to my invention;

Fig. 3 is a circuit illustrating a mode of operation involved in the systems of my invention;

Fig. 4 shows a curve of impedance vs. frequency involved in the circuit of Fig. 3;

Figs. 5, 6 and 7 are vector diagrams showing conditions obtained in the circuit of Fig. 3;

Figure 8:
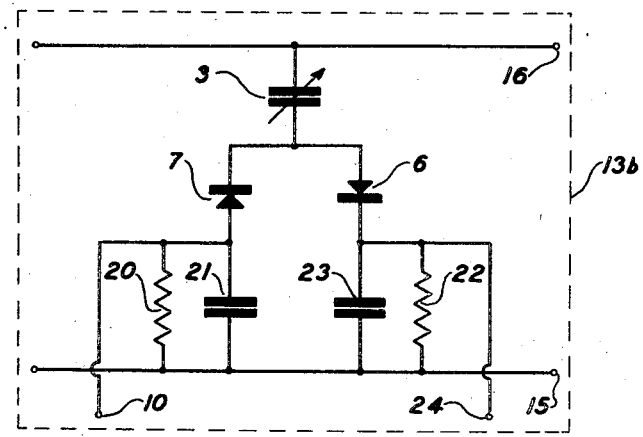
Fig. 8 shows another form of modulating circuit which may be used in the system of my invention.

Referring to Fig. 1, there is shown a carrier frequency oscillator or generator 1 having in series with it an isolation resistor 2 and a tuned circuit comprising an inductance 4 in parallel with a capacitance 5, tuned to approximately the generator frequency. The elements just described, referred to as the generator tuned circuit, are indicated as an entirety by the dotted rectangle 12.

There is connected with the generator tuned circuit a phase control or modulating circuit, these comprising the elements within the dotted rectangle 13. The modulating circuit comprises a condenser 3, preferably adjustable, connected from one side of the tuned circuit 4, 5 to the anode of a rectifier 6, the cathode of which is connected to the other side of the tuned circuit. In parallel with rectifier 6 is another arm comprising a rectifier 7 in series with a resistance 9 across which is a capacitance 8. The elements 6 and 7 are half-wave rectifiers and are preferably of the crystal type, such as germanium, having a non-linear conductivity characteristic with a high front to back resistance ratio, and a forward resistance that is very low compared to the reactance of capacitance 3 at the generator frequency. The directions of forward conductivity of the rectifiers are opposite to each other with reference to the current flowing from condenser 3. Thus, during a portion of one-half cycle of the generator frequency, rectifier 6 is relatively conductive, and during a portion of the other one-half cycle of the generator frequency, rectifier 7 is relatively conductive.

Capacitance 8 and resistor 9 comprise a load circuit for rectifiers 6 and 7. In actual operation, in my system the generator is operative at a sufficiently high voltage so that there appears a rectified and filtered D. C. voltage across load circuit 8, 9, which will usually equal some value between twice the R. M. S. value and twice the peak value of the generator voltage appearing across points 14, 15. In addition, some bias voltage will develop across condenser 3.

The time constant of resistor 9 and capacitance 8 being long compared to a cycle of the generator wave, the voltage due to the charge accumulated on capacitance 8 acts as a self-developed bias, which renders diodes 6 and 7 non-conductive during an appreciable part of each cycle. However, alternately during a portion of each one-half cycle the instantaneous value of voltage supplied by the generator exceeds the self-developed bias and renders one rectifier or the other conductive.

The self-developed D. C. voltage between terminals 10 and 11 across the resistor 9 is of such polarity as to oppose conduction by the rectifiers. Thus, rectifier 7 conducts only during that portion of the generator cycle when point 14 is negative, with respect to point 15, by an amount exceeding the D. C. voltage across load 9; and rectifier 6 conducts only during that portion of the generator cycle when point 14 is positive with respect to point 15.

In the circuits according to the present invention, the instantaneous relationships of currents and voltages in various parts of the system are complex in nature and difficult to predict by theoretical analysis alone. Although a positive theory complete in every detail and covering all conditions which occur in the system is not easy to postulate, it is believed that the essential features are in accordance with the descriptions hereinafter given.

During the intervals of each generator cycle when the rectifiers are relatively non-conducting, the condenser 3 is connected across the tuned circuit 4, 5 through the relatively high back resistance of the diodes. As this back resistance is very large compared to the reactance of condenser 3 at the oscillator frequency, the condenser 3 is in effect removed from across the tuned circuit 4, 5; so that condenser 3 has substantially no effect on the shape and phase of the voltage at points 15 and 16, which are the output terminals of the phase modulation system.

During the intervals of each generator cycle when either one of the diodes is fully conducting, however, the condenser 3 is effectively connected across the tuned circuit 4, 5 in series with the relatively low resistance of the diode which is conductive (the condenser 8 being of negligibly low reactance as compared with that of condenser 3). As this diode resistance is very low compared to the reactance of condenser 3 at the generator frequency, the resistance loss through the diodes is relatively low, and a substantial charging current flows through the condenser 3. The high charging current distorts the wave form across points 15 and 16, causing a phase shift of the voltage across those points relative to that delivered by the generator.

Varying the bias on the diodes varies the points on the generator voltage cycle at which the diodes become conductive and non-conductive, and consequently varies the portion of the cycle during which condenser 3 is effectively connected in parallel with elements 4 and 5. Increasing this bias causes condenser 3 to be effectively connected during a smaller portion of the cycle, and decreasing the bias causes condenser 3 to be effectively connected for a larger portion of the cycle. Such a decrease of the portion of the cycle during which condenser 3 is effectively connected has an effect on the phase of the voltage at points 15, 16 relative to that at the generator, which is somewhat similar to that which would be produced by reducing the net capacitance of elements 3, 4 and 5 in parallel. Conversely, such an increase of the portion of the cycle during which condenser 3 is connected has an effect on the phase relationship which is somewhat similar to that which would be produced by increasing the net capacitance of elements 3, 4 and 5.

Elements 3, 4 and 5 can be mutually adjusted with resistance 9 so as to produce a linear relationship between D. C. bias across resistance 9 and change of phase across points 15, 16 relative to the phase at the generator. This adjustment will ordinarily be done by adjusting elements 3, 4 and 5 for maximum voltage across points 15 and 16 in response to the generator voltage; element 9 being adjusted for a proper relationship of bias voltage relative to generator voltage so that the linear phase shift relation will occur for a considerable range of modulating voltage applied at points 10 and 11.

If a modulating signal of frequencies which are relatively low compared to the generator frequency is applied across points 10 and 11 across resistor 9, the phase of the voltage between output terminals 15 and 16 relative to that of the generator voltage, may be made to vary linearly with respect to the modulating voltage, thus achieving phase modulation.

In the arrangement of Fig. 1, the polarity of the rectifiers 6 and 7 can both be reversed with respect to the polarities indicated in the figure and the system will still be operative. The direction of forward conductivity of the two rectifiers should, however, be maintained opposite to each other relative to the voltage from the generator.

The generator portion of the system within dotted rectangle 12 is in schematic form; and it will be understood that various specific generator circuits may be employed within the scope of the invention.

The function of resistance element 2 in dotted rectangle 12 is to furnish isolation between the the generator 1 and the modulating portion of the circuit shown within dotted rectangle 13. If such isolation were absent or of inadequate amount, the modulating portion of the circuit may react directly on the generator, giving rise to unwanted variations in the absolute frequency of the generator voltage itself. The frequency of the original generator voltage should preferably remain substantially constant, and unaffected by currents elsewhere in the circuit, for instance by intermittent rectifier conduction. The desired phase modulation results from effective variations in the tuning of circuit 4, 5, by element 3, as previously described.

Fig. 2 illustrates an application of the invention showing a specific form of generator system within dotted rectangle 12a wherein the elements correspond with those within the dotted rectangle 12 of Fig. 1. The elements within dotted rectangle 13a of Fig. 2 correspond with the same numbered elements within dotted rectangle 13 of Fig. 1. In Fig. 2, the generator voltage is taken from the output of a vacuum tube buffer amplifier 18 which serves to isolate generator 1 from the subsequent parts of the circuit. The anode of tube 18 is shown connected through a coupling capacitance 19 to output terminal 16 which can lead to the input of a following stage. The output voltage of tube 18 is applied across inductance 4, which corresponds with the same numbered inductance in Fig. 1; although in Fig. 2, it is preferable to make inductance 4 adjustable. The low voltage side of inductance 4 is connected with a source of B voltage and a by-pass condenser 17 to the cathode, the capacity of condenser 17 being relatively large as compared with that of condenser 3.

It will be recognized that the carrier output voltage from tube 18 will be phase modulated by modulating voltage applied at terminals 10 and 11 so that the voltage impressed on the subsequent stage at terminals 15 and 16 will be phase modulated.

Although a considerable choice of circuit elements is permissible in keeping with good design practice and also dependent largely on the frequencies used and the purpose of the system, the following set of approximate values has been found useful in designing the system of Fig. 2 for a generator frequency of about 1650 kilocycles per second:

Tube 18, pentode tube type 6AK6
Capacity 19, 20 mmf.
Inductance 4, .6 millihenry (adjustable)
Capacity 3, 20 mmf. (adjustable)
Capacity 8, .003 mf.
Resistor 9, 50,000 ohms
Rectifiers 6, and 7, type 1N34 diodes Although germanium type rectifiers have been preferred for the circuits of my invention, these circuits are not necessarily limited to germanium rectifiers. Other types of non-linear circuit elements may be employed as elements 6 and 7, in my invention. A few of which may be used as follows: Vacuum diode, triode or multi-element tubes, gaseous diode, triode or multi-element tubes, and some types of thermistors or varistors. In some high voltage circuits spark gaps may be used and in some low frequency applications vibrator contacts may be employed.

The process of phase modulation involved in the systems of Figs. 1 and 2 can be understood to a considerable extent from the simplified schematic diagram of Fig. 3 which shows a carrier frequency generator 1 in series with an isolation resistance 2 and a parallel tuned circuit consisting of capacitance 5a, the inductance 4 corresponding to the same numbered element in Fig. 1, and the capacity 5a corresponding to the combination of capacities 5 and 3 in Fig. 1. When the elements 5a, 4 are tuned to resonance with the generator frequency, the total load in circuit with the generator is a non-reactive impedance and the voltage across the generator and the voltage across the tuned circuit are in phase with each other. If the adjustable capacitance of element 5a be increased somewhat, the resultant reactance across the tuned circuit will become inductive. This will appear from the curve A of Fig. 4 which shows the variation of impedance of the circuit in series with the generator with change of frequency. At the carrier frequency $f_c$ there occurs the resonance peak; and at the upper side of the resonance peak the impedance is capacitively reactive; and at the lower side it is inductive reactive. Increasing the capacitance shifts the peak to a lower frequency (curve B) with the result that the carrier frequency lies on the capacitive portion; and decreasing the capacitance moves the peak higher (curve C) with the result that the carrier frequency lies on the inductive portion.

Vectorally, the relationships are shown in Figs. 5, 6 and 7 wherein the vector E represents the voltage across the generator. When the condenser 5a is adjusted for its normal condition so that the tuned circuit 5a, 4 is tuned to the carrier frequency, the voltage E across the generator will be in phase with the current I flowing through it and will be the arithmetic sum of the voltage $E_r$ across the resistance 2 and the voltage $E_{Lc}$ across the tuned circuit, all in phase with each other as shown in Fig. 5. If the reactance of the circuit 5a, 4 be capacitive, the current flowing through the system will lead the generator voltage as shown by the vector I (Fig. 6) and the voltage across the resistance 2 will be in phase with I as indicated by the vector $E_r$. Since the voltage E is the vector sum of the voltage across the resistance and of the voltage across the circuit 5a, 4, it follows that the voltage $E_c$ across inductance 4 will lag the voltage E.

If now the circuit 5a, 4 be inductive at the carrier frequency, the vector relationship will be as shown in Fig. 7 with the current I lagging the voltage E. Since the voltage across the resistance will be in phase with the current through it $E_r$ will also lag voltage E and the voltage across the inductance will then lead the voltage E as represented by the vector $E_L$.

Accordingly, it will be seen that the vector representing the voltage across circuit 5a, 4 will swing from the in-phase position of resonance $E_{LC}$ (Fig. 5) either downwardly to a position $E_C$ (Fig. 6) or upwardly to a position $E_L$ (Fig. 7) and the phase angle from vector E will depend on the magnitude of the change of capacity 3.

Since the application of modulating voltage at terminals 10 and 11 in Figs. 1 and 2 has the net effect of increasing or decreasing the capacitance in the tuned circuit, as has been hereinabove explained, the modulating voltage will swing the voltage vector across inductance 4 relative to the generator vector, in accordance with the vector diagrams of Figs. 5 to 7 and through a vector angle determined by the instantaneous value of the modulating voltage.

Fig. 8 shows another method of loading the diodes to provide for a push-pull or balanced input to the modulator, the elements within dotted rectangle 13b representing a phase-modulation circuit corresponding to that within rectangle 13 in Fig. 1. The individual elements correspond with the same numbered elements in Fig. 1. A difference from Fig. 1 is that two load resistors 20 and 22 and two load capacitors 21 and 23 are employed instead of the single load resistor and capacitor of Fig. 1. Modulation voltage is applied to terminals 10 and 24; and these terminals are balanced at equal voltages with respect to terminal 15.

Figure 9:
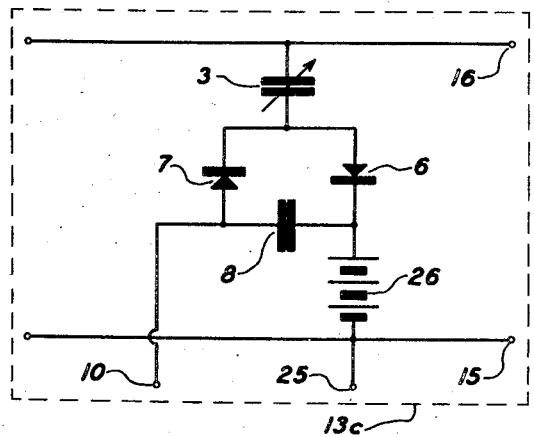
Fig. 9 shows still another form of phase modulating circuit used in my invention.

Another variation of the load circuit arrangement is shown in Fig. 9, wherein the load resistor 9 of Fig. 1 is removed and a load battery 26 is added. Here the circuit within dotted rectangle 13c corresponds with that within rectangle 13 of Fig. 1. The modulating voltage is applied across terminals 10 and 25. In this case the source of modulating voltage should present a low enough D. C. resistance to enable the proper bias to be supplied to the rectifiers.

Condenser 3 may be replaced by an inductance, and the circuit adjusted to perform similarly to those previously described. A difference will be a change in the sign of the phase shift; and also it may be necessary to isolate the rectifiers from external D. C. voltage. Or instead, condenser 3 may be replaced by some other combination of impedance which may suit the functions of the circuit. Combinations of inductance, capacitance and resistance in some predetermined proportions may be desirable for various systems. The resistive load system used in Figs. 1, 2 and 8 has advantages in some types of operation; and the system used in Fig. 9 has advantages in others. With the resistive load, the load voltage tends to retain a constant relation to the generator voltage for any variations in generator voltage. This maintains phase shift in the circuit relatively independent of generator voltage when no modulation voltage is present. With the system of Fig. 9, when there is no modulation voltage present, the phase shift will decrease with a decrease in generator voltage, and will increase with an increase in generator voltage. This may be desirable in some phase control systems.

In operation, the polarity of the diodes or unidirectional impedances 6 and 7 in the figures heretofore described, is not critical as long as they are oppositely connected with reference to condenser 3. A reversal of diode polarity from that previously described will merely reverse all polarities.

Figure 10:
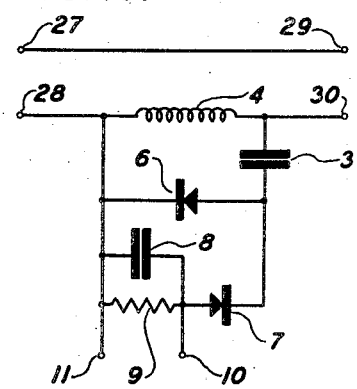
Fig. 10 illustrates a manner of producing phase shift in a line in accordance with my invention.

My novel system has many applications. Not only is it useful in communication systems, in a well known manner, but it also has other uses. For example, it is useful in phase control systems such as are useful with A. C. motors and servo mechanisms where it may be desirable to produce a controllable phase shift between two elements of a system. Such a circuit is shown in Fig. 10, wherein terminals 27 and 28 represent an input source of alternating current, and terminals 29 and 30 represent output terminals the phase of whose voltage it is desired to control with respect to the phase of the input voltage. Elements 3, 4, 6, 7, 8 and 9 correspond with the same numbered elements in Fig. 1.

Proper values for these elements may be selected to produce a desirable voltage phase shift between the input and output terminals when no external voltage is applied across terminals 10, 11. An external voltage applied across 10, 11 may then be used to vary the phase shift between the input and output terminals.

Figure 11:
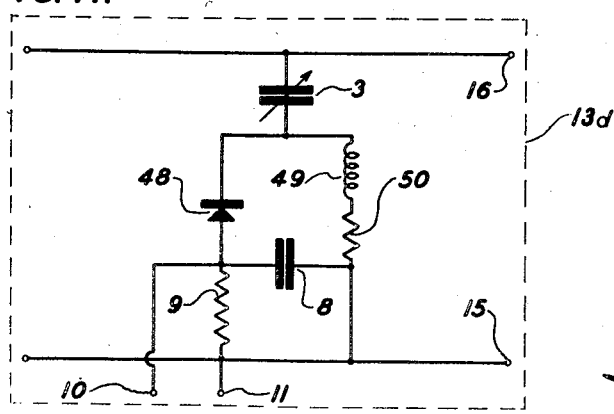
Fig. 11 shows another form of modulation portion which may be used in a phase modulating system according to my invention.

The several embodiments thus far described have been in the preferred form in which the reactance 3 is placed across the oscillator circuit alternately through two paths each comprising a non-linear impedance. It is possible, however, to connect the condenser 3 across the oscillator circuit through a single path containing the non-linear impedance. Such an arrangement is illustrated in Fig. 11 wherein a single rectifier or non-linear impedance element 48 is used in place of the two non-linear impedances 12 and 13 of Fig. 1, or of the non-linear impedances in the other preceding figures. To provide a complete path for the unidirectional current developed at the non-linear impedance 48, there is provided an inductance 49 connected between the upper side of the rectifier 48 and the terminal 15 so that there is a direct current path through elements 48, 49 and 9. Preferably a resistance 50 is also connected in series with inductance 49 to provide some damping and thus prevent any undesirable resonance effects which may develop due to the inductance.

In the operation of Fig. 11, rectification occurs only at intervals within alternate half cycles of the oscillator; and the operation is somewhat similar to that described in connection with the preceding figures.

It will be recognized that by my invention, I have provided an effective and yet simple system for producing phase modulation. Since the invention has a wide range of applications, it should not be considered to be limited to the particular forms and modifications disclosed, which are given by way of illustration and example, rather than by way of limitation; and the invention should not be limited except in accordance with the scope of the appended claims.

Numerous modifications within the scope of the invention will readily suggest themselves. It may be possible, for example, to introduce variations in the modulation. Such variations may be introduced, for example, by changing the value of the isolating resistance between the generator and the tuned circuit responsive thereto. Reducing the value of the isolating impedance or resistance relative to the other impedances in the generator circuit would have the effect of a closer coupling between the generator and its tuned circuit; and this may introduce some frequency modulation in addition to the phase modulation herein described. Regardless of whether or not frequency modulation is present, phase modulation as described herein, will be had so long as there is a sufficiently large isolating impedance, so that the change of phase across the tuned circuit can occur in response to the modulating voltage.

As an example of another possible modification, the capacitor 3 throughout all the figures in which it appears may be replaced, if desired, by an inductance or by some combination of inductance and capacitance. In the case of such a combination, the inductance and capacitance may be either in series or in parallel with each other.

I claim:

1. A phase modulation system comprising a series circuit containing a carrier frequency generator, a resonant circuit coupled to the generator, said resonant circuit comprising an inductance and capacitance in parallel with each other and normally tuned to the carrier frequency, and an isolating impedance connected between the generator and the resonant circuit, and a phase modulation circuit connected across said inductance, said modulation circuit comprising a reactance element in series with two parallel paths, one of the parallel paths comprising a non-linear impedance, the other of the parallel paths comprising a non-linear impedance in series with a parallel-arranged load resistance and capacitance, the directions of forward conductivity of the two non-linear impedances being opposed to each other with reference to said reactance element, whereby application of a modulating voltage across said load resistance produces phase modulation of the carrier frequency at the resonant circuit.

2. A phase modulation system according to claim 1 in which the non-linear impedances are rectifiers.

3. A phase modulation system according to claim 1 in which the non-linear impedances are crystal rectifiers.

4. A phase modulation system according to claim 1 in which the non-linear impedances are diode rectifiers.

5. A phase modulation system according to claim 1 in which the reactance element is a condenser.

6. A phase modulation system comprising a source of carrier frequency oscillations, an electrical path connected across said source, said path comprising, in series, a tuned circuit having an inductance and a capacitance in parallel and an isolating resistance which isolates the tuned circuit from the generator, a modulation circuit connected across the tuned circuit, said modulation circuit comprising a rectance element in series with two parallel paths, each of said paths containing a rectifier presenting a much lower impedance in one direction than in the other direction, and the direction of lower impedance of the two rectifiers being opposed to each other with reference to the reactance element, and means for connecting a source of modulation voltage in one of the paths.

7. A phase modulation system according to claim 6 in which the means for connecting the source of modulation voltage comprises a resistance having a voltage source connected with it.

8. A phase modulation system according to claim 7 in which a condenser is connected across the resistance.

9. A phase modulation system comprising a source of carrier frequency oscillations, an electrical path connected across said source, said path comprising an isolating resistance in series with a tuned circuit having an inductance in parallel with a capacitance, a modulating circuit connected across at least part of said tuned circuit, said modulating circuit comprising a reactance element in series with two parallel paths each of said paths containing a non-linear impedance and one of the paths containing a source of modulating voltage, the direction of forward conductivity of the two non-linear impedances being opposed to each other with reference to the reactance element, whereby the reactance element is effectively connected across said tuned circuit part alternately through the two non-linear impedances and at the carrier frequency.

10. A phase modulation system comprising a source of carrier frequency oscillations in series with a resistance and a tuned circuit normally tuned to the carrier frequency and the variation of whose reactance varies the phase of the carrier frequency oscillations, a modulating circuit connected across said tuned circuit, said modulating circuit comprising a reactance element in series with two parallel paths, each of said paths containing a rectifier presenting a much lower impedance in one direction than in the other direction, and the direction of lower impedance of the two rectifiers being opposed to each other with reference to the reactance element and means for connecting a source of modulating voltage between the sides of the two rectifiers which are remote from said reactance element.

11. A phase modulation system comprising a source of carrier frequency oscillations in series with a resistance and a tuned circuit normally tuned to the carrier frequency and the variation of whose reactance varies the phase of the oscillations, said modulation system comprising a reactance element in series with two parallel paths, each of said paths containing a rectifier presenting a much lower impedance in one direction than in the other direction, and the direction of lower impedance of the two rectifiers being opposed to each other with reference to the reactance element, an impedance in series with each rectifier and at the side thereof remote from said reactance element, the sides of said impedance remote from the rectifiers being connected together and to the tuned circuit and a source of modulating voltage connected between the junction which one rectifier makes with the impedance in series therewith and the junction which the other rectifier makes with the impedance in series therewith.

12. A system according to claim 11 in which the impedances in series with the two rectifiers are of equal value.

13. A system according to claim 11 in which each impedance in series with its associated rectifier comprises a resistance in parallel with a condenser which is of negligibly small reactance at the oscillator frequency.

14. A phase modulation system comprising a source of carrier frequency oscillations, a circuit coupled to said source, a resistive impedance connected between the source and the circuit and isolating the circuit from the source, the phase of the voltage across said circuit relative to the voltage at the source being variable with change of reactance across said circuit, a rectifier system comprising a non-linear impedance in series with a resistive load connected across two points of the circuit, said non-linear impedance developing a unidirectional bias voltage across said load in response to the voltage from the source, and a source of modulation voltage connected across said resistive load.

15. A phase modulation system comprising a source of carrier frequency oscillations, a circuit coupled to said source, a resistive impedance connected between the source and the circuit and isolating the circuit from the source, the phase of the voltage across said circuit relative to the voltage at the source being variable with change of reactance across said circuit, a rectifier system comprising a non-linear impedance in series with a resistive load, a reactance in series with said rectifier system, the series arranged reactance and rectifier system being connected across said non-linear impedance and developing a unidirectional bias voltage due to the carrier frequency voltage across the non-linear impedance, and a source of modulation voltage across said resistive load.

16. A phase modulation system according to claim 15 in which said reactance which is in series with said rectifier system comprises an inductance.

17. A phase modulation system according to claim 15 in which said reactance which is in series with said rectifier system comprises a combination of inductance and capacitance.

MARCUS A. McCOY.

REFERENCES CITED

The following references are of record in the file of this patent:

UNITED STATES PATENTS

| Number | Name | Date |
|---|---|---|
| 2,077,223 | Crosby | Apr. 13, 1937 |
| 2,374,000 | Crosby | Apr. 17, 1945 |
| 2,461,307 | Antalek | Feb. 8, 1949 |
| 2,469,837 | Mohr | May 10, 1949 |

FOREIGN PATENTS

| Number | Country | Date |
|---|---|---|
| 561,322 | Great Britain | May 15, 1944 |